United States Patent Office 2,879,251
Patented Mar. 24, 1959

2,879,251

ACCELERATOR

Nelson V. Seeger, Cuyahoga Falls, and Thomas G. Mastin, Akron, Ohio, assignors, by mesne assignments, to The Goodyear Tire & Rubber Company, a corporation of Ohio No Drawing. Continuation of application Serial No. 327,149, December 20, 1952. This application November 20, 1956, Serial No. 623,287

6 Claims. (Cl. 260—45.4)

This invention relates to a method of accelerating the reaction between organic compounds containing reactive hydrogen and compounds containing isocyanate groups. More particularly it relates to an accelerator for the preparation of synthetic elastomeric polymers. Still more specifically it relates to an accelerator for the cross-linking reactions between polyisocyanates and elastomeric diisocyanate-modified linear polyesters and polyesteramides such as those described in United States Patents 2,625,532; 2,625,531; 2,760,953 and copending application Serial Number 305,914, filed August 22, 1952, and issued January 15, 1957, as United States Patent 2,777,831. These materials which are described in detail below, will hereinafter be referred to as elastomeric diisocyanate-modified linear polymers.

It has been known to use water and water-liberating compounds, such as salts carrying water of crystallization, in the cure or cross-linking of elastomeric diisocyanate-modified polymers. Such materials are known to accelerate the cure of elastomeric dissocyanate-modified polymers. However, the use of such materials is not entirely satisfactory because the reactions involved produce $CO_2$ gas which causes blisters or bubbles in the cured product. In addition the water reacts with the isocyanate radicals present with the result that more polyisocyanate than that normally required must be added to effect a complete cure.

It is therefore another object of this invention to provide an accelerator for the cure of elastomeric dissocyanate-modified polymers which does not produce the objectionable results obtained by using water or water-liberating compounds. It is still another object of this invention to provide an accelerator for the cure of elastomeric diisocyanate-modified polymers which functions as a catalyst for the cross-linking reaction and which itself does not chemically enter into the reaction. Other objects will appear as the description proceeds.

According to the practice of this invention, the elastomeric diisocyanate-modified linear polymer is mixed with the polyisocyanate required to effect a cure of the elastomer and, in addition, the accelerator referred to above, this being magnesium oxide. Magnesium oxide catalyzes the reaction between the —NCO groups of the polyisocyanate and the urethane, urea, or amide linkages present along the molecular chains in the modified polymer and thus effects an accelerated cure with consequent saving of time and increased production from each unit of equipment. Magnesium oxide appears to be the only metallic oxide operable for the purposes of this invention. Other oxides which have been tried and found to be inoperative for the purposes of this invention are the oxides of lead, zinc, iron, aluminum, calcium, and titanium.

The amount of magnesium oxide required to catalyze the reaction between the polyisocyanates and the diisocyanate-modified polymer will, of course, vary depending upon the other ingredients used in compounding the elastomer. In general, there may be used as little as 0.25 part or as much as 75 parts of the oxide by weight per 100 parts of elastomeric polymer by weight. A preferred range is from 0.50 to 10.0 parts by weight per 100 parts of polymer while a more particularly preferred range is from 1.0 to 5.0 parts by weight. In general it may be said that the degree of acceleration is proportional to the amount of oxide used, since, normally, increased amounts of accelerator will reduce the time required to effect a cure. However, amounts of magnesium oxide in excess of about 10 parts by weight do not seem to have any added effect upon the rate of cure of the elastomer.

While each class of elastomeric diisocyanate-modified linear polyesters has been fully described in the applications referred to above, the general chemical reactions involved in their preparation have been illustrated in United States Patent 2,763,628.

The curing or cross-linking of the uncured polymers takes place as the result of reaction between the —NCO groups in the curing agent and the reactive hydrogens in certain groups present in the chain of the extended polymer and certain terminal groups at the ends of the chain-extended units. The terminal groups include, of course, hydroxyl, carboxyl, and amino radicals. The groups along the chain include the groups formed by reaction between an —NCO group and a carboxylic, hydroxyl, or amino group, and may be represented as a substituted amide linkage

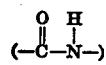

a carbamic radical

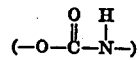

and a ureylene radical

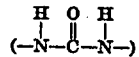

respectively. Each of these groupings has at least one active hydrogen available for reaction with the —NCO group of the polyisocyanate used to effect a cure.

The elastomeric diisocyanate-modified linear polymers may be grouped in four general classes.

First, the reaction product of (1) a polyester or polyesteramide prepared from at least one dibasic carboxylic acid and at least one glycol, and/or at least one amino alcohol, and/or at least one diamine; the number of hydrogen-bearing amino groups being present in an amount not to exceed 7.5% of the total hydroxyl and hydrogen-bearing amino groups present, the polyester or polyester-amide having a hydroxyl number from 40 to 100 (a preferred range is from 50 to 60) and an acid number from 0 to 7; and (2) at least one diisocyanate selected from the group consisting of 4,4'-diphenyl diisocyanate; 4,4'-diphenylene methane diisocyanate; dianisidine diisocyanate; 4,4'-tolidine diisocyanate; 1,5-naphthalene diisocyanate; 4,4'-diphenyl ether diisocyanate; and p-phenylene diisocyanate, the diisocyanate being used in an amount ranging from 0.70 to 0.99 (a preferred range is from 0.90 to 0.99) mol per mol of polyester or polyesteramide.

Second, the reaction product of (1) a polyester or polyesteramide prepared from at least one dibasic carboxylic acid, and at least one glycol, and/or at least one amino alcohol and/or at least one diamine, the number of hydrogen-bearing amino groups present being in an amount not to exceed 30% of the total hydroxyl and hydrogen-bearing amino groups present, the polyester or polyesteramide having a hydroxyl number from 30 to 140 (a preferred range is from 50 to 60) and an acid number from 0 to 12; and (2) at least one tolylene diisocyanate, the diisocyanate being used in an amount ranging from 0.85 to 1.10 (a preferred range is from 0.90 to 1.00) mols per mol of polyester or polyesteramide.

Third, the reaction product resulting from the reaction of a mixture comprising (1) a polyester prepared from bifunctional ingredients including at least one dibasic carboxylic acid containing at least three carbon atoms, and at least one glycol, said polyester having a hydroxyl number from 30 to 140 (a preferred range is from 50 to 60) and an acid number from 0 to 12; (2) at least one bifunctional additive selected from the group consisting of diamines, amino alcohols, dicarboxylic acids, hydroxy carboxylic acids, amino carboxylic acids and the ureas, guanidines and thioureas containing a primary amino group, said bifunctional additive being used in an amount such that the total number of —NH$_2$ and —COOH equivalents present in said bifunctional reactant shall be from 0.06 to 0.24 equivalent per mol of polyester, and (3) at least one tolylene diisocyanate, the diisocyanate being used in an amount equal to the sum of from 0.85 mol to 1.10 (a preferred range is from 0.90 to 1.00) mols of diisocyanate per mol of polyester plus the molar amount of diisocyanate equivalent to the mols of said bifunctional additive used.

Fourth, the reaction product resulting from the reaction of a mixture comprising (1) a polyester prepared from bifunctional ingredients including at least one dibasic carboxylic acid containing at least three carbon atoms and at least one glycol, said polyester having a hydroxyl number between 40 and 100 (a preferred range is from 50 to 60) and an acid number from 0 to 7; (2) at least one bifunctional additive selected from the group consisting of diamines, amino alcohols, dicarboxylic acids, hydroxy carboxylic acids, amino carboxylic acids, and the ureas, guanidines, and thioureas containing a primary amino group, said bifunctional additive being used in an amount such that the total number of —NH$_2$ and —COOH equivalents present in said bifunctional reactant shall be from 0.06 to 0.48 equivalent per mol of polyester, and (3) at least one diisocyanate selected from the group consisting of 4,4'-diphenyl diisocyanate; 4,4'-diphenylene methane diisocyanate; 4,4'-tolidine diisocyanate; dianisidine diisocyanate; 1,5-naphthalene diisocyanate; 4,4'-diphenyl ether diisocyanate; and p-phenylene diisocyanate, the diisocyanate being used in an amount equal to the sum of from 0.70 mol to 0.99 (a preferred range is from 0.90 to 0.99) mol of diisocyanate per mol of polyester plus the molar amount of diisocyanate equivalent to the mols of bifunctional additive used.

The amount of polyisocyanate required to cure or cross-link the elastomeric diisocyanate-modified linear polymers is held within certain limits. Any diisocyanate, polyisocyanate or mixtures of polyisocyanates, or both, may be used. When curing the polymers of the first and second classes, enough polyisocyanate must be added to the polymer so that the total amount of —NCO equivalents, including that added in the formation of the polymer, shall be from 2.80 to 3.20 equivalents per mol of polyester or polyesteramide.

When curing the polymers of the third and fourth class, enough polyisocyanate must be added to the polymer so that the total amount of —NCO equivalents, including that added in the formation of the polymer, shall be equal to the sum of from 2.80 to 3.20 equivalents per mol of polyester or polyesteramide plus twice the molar amount of bifunctional additive used in preparing the polymer. Smaller amounts of polyisocyanate added to cure the polymer will result in an under-cured product. The use of greater amounts is a waste of material with no improved properties in the cured product and in some cases produces a cured material having properties more resinous than rubber-like. If a triisocyanate or tetraisocyanate is used in place of a diisocyanate to effect a cure, not as much material, on a mol basis, need be used, since the curing or cross-linking of the linear molecules depends upon the number of —NCO groups present in the curing agent. For example, if 0.50 mol of a diisocyanate gives a satisfactory cure of a diisocyanate-modified polyester or polyesteramide, the use of approximately 0.25 mol of a tetraisocyanate will result in a similar state of cure.

The actual curing of the polymer is accomplished by methods familiar to those skilled in the art. The time and temperature required to effect the best cure for any particular polymer will of course vary as is the case with the curing of conventional natural rubber compounds. The cure for best results should be accomplished by the use of dry heat since exposure of the polymer to hot water or steam results in a partial degeneration of the cured material.

Disclosed in United States Patent 2,763,628 are the reactants used to form some preferred polyesters and polyesteramides which, when prepared and subsequently modified by a diisocyanate and, optionally a bifunctional additive in accordance with the appropriate limitations indicated in the description of the four types of synthetic elastomers, will produce elastomeric products. Also listed in that patent are preferred diisocyanates combined with preferred polyesters and polyesteramides employed to form elastomeric diisocyanate-modified linear polymers employed in the practice of this invention.

Of the various elastomeric diisocyanate-modified linear polymers described in the patents referred to above and useful in the practice of this invention, the preferred polymers are:

(1) Those prepared from the reaction of a mixture comprising (A) a polyester prepared from at least one dibasic carboxylic acid and at least one glycol, said polyester having a hydroxyl number from 40 to 100 and an acid number from 0 to 7 and (B) 4,4'-diphenyl diisocyanate used in an amount ranging from 0.90 to 0.99 mol per mol of said polyester.

(2) Those prepared from the reaction of a mixture comprising (A) a polyester prepared from at least one dibasic carboxylic acid and at least one glycol, said polyester having a hydroxyl number from 30 to 140 and an acid number from 0 to 12 and (B) tolylene diisocyanate used in an amount ranging from 0.90 to 1.00 mol per mol of said polyester.

(3) Those prepared from the reaction of a mixture comprising (A) a polyester prepared from at least one dibasic carboxylic acid containing at least three carbon atoms and at least one glycol, said polyester having a hydroxyl number from 30 to 140 and an acid number from 0 to 12, (B) a diamine used in an amount such that the total number of —NH$_2$ equivalents is from 0.06 to 0.24 equivalent per mol of polyester and (C) tolylene diisocyanate used in an amount equal to the sum of from 0.90 to 1.00 mol per mol of polyester plus the molar amount of diisocyanate equivalent to the mols of diamine used.

(4) Those prepared from the reaction of a mixture comprising (A) a polyester prepared from at least one dibasic carboxylic acid containing at least three carbon atoms and at least one glycol, said polyester having a hydroxyl number from 40 to 100 and an acid number from 0 to 7, (B) a diamine used in an amount such that the total number of —NH$_2$ equivalents is from 0.06 to 0.48 equivalent per mol of polyester and (C) 4,4'-diphenyl diisocyanate used in an amount equal to the sum of from 0.90 to 0.99 mol per mol of polyester plus the molar amount of diisocyanate equivalent to the mols of diamine used.

(5) Those prepared from the reaction of a mixture comprising (A) a polyester prepared from at least one dibasic carboxylic acid containing at least one glycol, said polyester having a hydroxyl number from 40 to 100 and an acid number from 0 to 7, (B) a diamine used in an amount such that the total number of —NH$_2$ equivalents shall be from 0.06 to 0.48 equivalent per mol of polyester and (C) 4,4'-tolidine diisocyante used in an amount equal to the sum of from 0.90 to 0.99 mol per mol of polyester plus the molar amount of diisocyanate equivalent to the mols of diamine used.

The following examples, in which parts are by weight, are illustrative of the preparation of polyesters and elastomeric diisocyanate-modified polymers and the use thereof in the practice of this invention. These examples are representative rather than restrictive of the scope of this invention.

EXAMPLE 1

Preparation of a typical polyester

Adipic acid (3515 parts) was placed in a 5 liter, 3-necked flask fitted with a stirrer, thermo-couple well, gas inlet tube, distilling head, and condenser. To the acid were added 1064 parts of ethylene glycol and 869 parts of propylene 1,2 glycol. The molar ratio of dibasic acid to glycol is 1:1.19. The mixture was heated to 130–160° C. until most of the water had distilled off. The temperature was then gradually raised to 200° C., the pressure being gradually reduced to 20 mm. and nitrogen being bubbled through the melt. After 23½ hours a soft white waxy solid was obtained. Determinations showed the acid number to be 3.5 and the hydroxyl number to be 58.6.

EXAMPLE 2

Preparation of the diisocyanate-modified polymer

A quantity of polyester was prepared from adipic acid, ethylene glycol, and propylene 1,2 glycol according to the general method and in substantially the same ratios as shown in Example 1. This polyester had an acid number of 3.1 and a hydroxyl number of 55.6. After heating 2270 parts of this polyester in a steam-heated Baker-Perkins mixer to 120° C., 4,4'-diphenyl diisocyanate (280.3 parts of 95.7% purity or 0.96 mol per mol of polyester) was added. After ten minutes of mixing the hot melt was poured into a carnauba wax coated tray and baked for 8 hours at 130° C. The resulting polymer had excellent processing characteristics on a rubber mill. Tests showed the following physical properties—intrinsic viscosity 1.69, percent gel 3.9, plastic flow (1500 p.s.i.— 212° F.) 85 seconds per inch, and softening point 186° C.

EXAMPLE 3

Preparation of the diisocyanate-modified polymer

A quantity of polyester was prepared from adipic acid, ethylene glycol, and propylene 1,2 glycol according to the general method and in substantially the same ratios as shown in Example 1. This polyester had an acid number of 3.1 and a hydroxyl number of 55.6. After heating 200 parts of this polyester to 120° C. in an iron kettle, 2,4-tolylene diisocyanate (20.11 parts of 99.7% purity or 1.10 mols of diisocyante per mol of polyester) was added. After 15 minutes of mixing, the material was poured into a waxed aluminum tray and baked for 8 hours at 120° C. The resulting polymer had excellent processing characteristics on a rubber mill.

To illustrate the effect of magnesium oxide on the state of cure of the elastomeric diisocyanate-modified polymers, listed below are the formulations and the test results of the elastomers accelerated according to the practice of this invention. Formulations are shown in parts by weight. Tensile strength values are expressed in pounds per square inch, and the modulus is a measure of the pounds per square inch required to elongate the test sample 500%.

| Formulation | 1 | 2 | 3 | 4 |
| --- | --- | --- | --- | --- |
| Elastomer 2 | 100 | 100 | | |
| Elastomer 3 | | | 100 | 100 |
| 4,4'-diphenylene diisocyanate | 6.62 | 6.62 | | |
| 2,4-tolylene diisocyanate | | | 6.58 | 6.58 |
| Magnesium Oxide | | 2.00 | | 5.00 |
| Tensile Strength: | | | | |
| Cured 5 minutes at 280° F | 2,000 | 2,900 | 1,250 | 2,450 |
| Cured 10 minutes at 280° F | 1,850 | 2,350 | 1,100 | 2,450 |
| Cured 20 minutes at 280° F | 2,425 | 2,800 | 975 | 1,950 |
| Cured 30 minutes at 280° F | 2,450 | 2,800 | 900 | 1,400 |
| Cured 15 minutes at 240° F | | | 1,125 | 1,350 |
| Cured 15 minutes at 260° F | | | 1,225 | 2,000 |
| Cured 15 minutes at 280° F | | | 900 | 2,100 |
| Cured 15 minutes at 300° F | | | 900 | 1,750 |
| Cured 15 minutes at 320° F | | | 225 | 600 |
| Modulus 500%: | | | | |
| Cured 5 minutes at 280° F | 900 | 1,200 | 500 | 1,025 |
| Cured 10 minutes at 280° F | 900 | 1,050 | 375 | 1,000 |
| Cured 15 minutes at 280° F | 900 | 1,025 | 450 | 825 |
| Cured 20 minutes at 280° F | 850 | 1,025 | 425 | 750 |
| Cured 30 minutes at 280° F | 775 | 1,050 | 300 | 675 |

Elastomers 2 and 3 shown in the above formulations were prepared according to Examples 2 and 3 respectively. The elastomer, diisocyanate and magnesium oxide were mixed together on a rubber mill in accordance with normal procedure in the rubber art.

Analysis of the test results presented above will indicate two advantages attained by the use of magnesium oxide. First, the rate of cure is accelerated as is evidenced by the markedly higher tensile and moduli results in the samples cured for shorter times or at lower temperatures. It will be noted that the formulations 2 and 4 containing magnesium oxide produce compounds which achieve their highest tensile strength when cured for 5 minutes at 280° F. while the same compounds without magnesium oxide (formulations 1 and 3) do not achieve equal tensile strengths even when cured for 30 minutes at 280° F. The reduction in optimum curing time by use of the magnesium oxide results in a reduction in production costs because of the increased curing capacity available from each unit of equipment.

In addition to accelerating the cure, magnesium oxide has a stabilizing effect upon the physical properties of the formulations as is shown by the lower reduction in tensile strength and moduli of the magnesium oxide formulations cured for longer times or at a higher temperature. The stabilization of the physical properties over longer periods of curing times and for greater variations in curing temperatures is to be desired particularly where thick sections are being cured such as in a pneumatic tire. Using such heat-stabilized materials it is possible to produce a product of thick cross section which is cured adequately at the center and is still not appreciably over-cured at the surface—such over-cure being minimized by the heat-stable compounds whose cured physical properties remain substantially constant at varying curing times and temperatures.

This application is a continuation of our copending application Serial Number 327,149, filed December 20, 1952, which is a continuation-in-part of Serial Number 248,659, filed September 27, 1951, both now abandoned.

While certain representative embodiments and details have been shown for the purpose of illustrating the invention, it will be apparent to those skilled in this art that various changes and modifications may be made therein without departing from the spirit or scope of the invention.

We claim:
1. The method of catalyzing the reaction between an elastomeric diisocyanate-modified linear polymer and an organic polyisocyanate which comprises conducting said reaction in the presence of magnesium oxide, said elastomeric diisocyanate-modified linear polymer being selected from the group consisting of (A) the reaction product resulting from the reaction of a mixture comprising (1) a material prepared from bifunctional ingredients including at least one dicarboxylic acid and at least one complementary bifunctional reactant in which the functional groups are selected from the class consisting of the hydroxyl group and the hydrogen-bearing amino groups, the hydrogen-bearing amino groups being present in an amount not to exceed 7.5% of the total functional groups of said complementary bifunctional reactant, said material having a hydroxyl number from 40 to 100 and an acid number from 0 to 7, and (2) at least one diisocyanate selected from the group consisting of 4,4'-diphenyl diisocyanate; 4,4'-diphenylene methane diisocyanate; dianisidine diisocyanate; 4,4'-tolidine diisocyanate; 1,5-naphthalene diisocyanate; 4,4'-diphenyl ether diisocyanate, and p-phenylene diisocyanate, the diisocyanate being used in an amount ranging from 0.70 to 0.99 mol per mol of said material; (B) the reaction product resulting from the reaction of a mixture comprising (3) a material prepared from bifunctional ingredients including at least one dicarboxylic acid and at least one complementary bifunctional reactant in which the functional groups are selected from the class consisting of the hydroxyl group and the hydrogen-bearing amino groups, the hydrogen-bearing groups being present in an amount not to exceed 30% of the total functional groups of said complementary bifunctional reactant, said material having a hydroxyl number from 30 to 140 and an acid number from 0 to 12, and (4) at least one tolylene diisocyanate used in an amount ranging from 0.85 to 1.10 mols per mol of said material; (C) the reaction product resulting from the reaction of a mixture comprising (5) a polyester prepared from bifunctional ingredients including at least one dicarboxylic acid containing at least three carbon atoms, and at least one glycol, said polyester having an hydroxyl number from 30 to 140 and an acid number from 0 to 12, (6) at least one bifunctional additive selected from the group consisting of diamines, amino alcohols, dicarboxylic acids, amino carboxylic acids, hydroxy carboxylic acids and the ureas, guanidines, and thioureas containing a primary amino group, said bifunctional additive being used in an amount such that the total number of —NH₂ and —COOH equivalents present in said bifunctional reactant shall be from 0.06 to 0.24 equivalent per mol of polyester, and (7) at least one tolylene diisocyanate used in an amount equal to the sum of from 0.85 mol to 1.10 mols of diisocyanate per mol of polyester plus the molar amount of diisocyanate equivalent to the mols of said bifunctional additive used; (D) the reaction product resulting from the reaction of a mixture comprising (8) a polyester prepared from bifunctional ingredients including at least one dicarboxylic acid containing at least three carbon atoms and at least one glycol, said polyester having a hydroxyl number between 40 and 100 and an acid number from 0 to 7, (9) at least one bifunctional additive selected from the group consisting of diamines, amino alcohol, dicarboxylic acids, amino carboxylic acids, hydroxy carboxylic acids, and the ureas, guanidines and thioureas containing a primary amino group, said bifunctional additive being used in an amount such that the total number of —NH₂ and —COOH equivalents present in said bifunctional reactants shall be from 0.06 to 0.48 equivalent per mol of polyester, and (10) at least one diisocyanate selected from the group consisting of 4,4'-diphenyl diisocyanate; 4,4'-diphenylene methane diisocyanate; 4,4'-tolidine diisocyanate; dianisidine diisocyanate; 1,5-naphthalene diisocyanate; 4,4'-diphenyl ether diisocyanate, and p-phenylene diisocyanate, the diisocyanate being used in an amount equal to the sum of from 0.70 mol to 0.99 mol of diisocyanate per mol of polyester plus the molar amount of diisocyanate equivalent to the mols of bifunctional additive used; (A) and (B) being reacted with a sufficient amount of at least one organic polyisocyanate to bring the total number of —NCO equivalents present to from 2.80 to 3.20 equivalents per mol of said material and (C) and (D) being reacted with a sufficient amount of at least one organic polyisocyanate to bring the total number of —NCO equivalents present to the sum of from 2.80 to 3.20 equivalents per mol of said polyester plus twice the molar amount of bifunctional additive used in the preparation of said elastomeric reaction product.

2. The method defined by claim 1 in which the elastomeric diisocyanate-modified linear polymer results from the reaction of a mixture comprising (A) a polyester prepared from at least one dicarboxylic acid and at least one glycol, said polyester having a hydroxyl number from 40 to 100 and an acid number from 0 to 7 and (B) 4,4'-diphenyl diisocyanate used in an amount ranging from 0.90 to 0.99 mol per mol of said polyester.

3. The method defined by claim 1 in which the elastomeric diisocyanate-modified linear polymer results from the reaction of a mixture comprising (A) a polyester prepared from at least one dicarboxylic acid and at least one glycol, said polyester having a hydroxyl number from 30 to 140 and an acid number from 0 to 12 and (B) tolylene diisocyanate used in an amount ranging from 0.90 to 1.00 mol per mol of said polyester.

4. The method defined by claim 1 in which the elastomeric diisocyanate-modified linear polymer results from the reaction of a mixture comprising (A) a polyester prepared from at least one dicarboxylic acid containing at least three carbon atoms and at least one glycol, said polyester having a hydroxyl number from 30 to 140 and an acid number from 0 to 12, (B) a diamine used in an amount such that the total number of —NH₂ equivalents is from 0.06 to 0.24 equivalent per mol of polyester and (C) tolylene diisocyanate used in an amount equal to the sum of from 0.90 to 1.00 mol per mol of polyester plus the molar amount of diisocyanate equivalent to the mols of diamine used.

5. The method defined by claim 1 in which the elastomeric diisocyanate-modified linear polymer results from the reaction of a mixture comprising (A) a polyester prepared from at least one dicarboxylic acid containing at least three carbon atoms and at least one glycol, said polyester having a hydroxyl number from 40 to 100 and an acid number from 0 to 7, (B) a diamine used in an amount such that the total number of —NH₂ equivalents is from 0.06 to 0.48 equivalent per mol of polyester and (C) 4,4'-diphenyl diisocyanate used in an amount equal to the sum of from 0.90 to 0.99 mol per mol of polyester plus the molar amount of diisocyanate equivalent to the mols of diamine used.

6. The method defined by claim 1 in which the elastomeric diisocyanate-modified linear polymer results from the reaction of a mixture comprising (A) a polyester prepared from at least one dicarboxylic acid and at least one glycol, said polyester having a hydroxyl number from 40 to 100 and an acid number from 0 to 7, (B) a diamine used in an amount such that the total number of —NH₂ equivalents shall be from 0.06 to 0.48 equivalent per mol of polyester and (C) 4,4'-tolidine diisocyanate used in an amount equal to the sum of from 0.90 to 0.99 mol per mol of polyester plus the molar amount of diisocyanate equivalent to the mols of diamine used.

No references cited.